(12) United States Patent
Strothmann

(10) Patent No.: US 10,161,735 B2
(45) Date of Patent: Dec. 25, 2018

(54) APPARATUS FOR DETERMINING THE ANGULAR POSITION OF THE ROTOR OF AN ELECTRIC MACHINE

(76) Inventor: Rolf Strothmann, Saarbrücken (DE)

(*) Notice: Subject to any disclaimer, the term of this patent is extended or adjusted under 35 U.S.C. 154(b) by 1082 days.

(21) Appl. No.: 13/885,836

(22) PCT Filed: Nov. 23, 2011

(86) PCT No.: PCT/DE2011/075283
§ 371 (c)(1),
(2), (4) Date: May 16, 2013

(87) PCT Pub. No.: WO2012/097782
PCT Pub. Date: Jul. 26, 2012

(65) Prior Publication Data
US 2013/0245994 A1    Sep. 19, 2013

(30) Foreign Application Priority Data
Nov. 24, 2010    (DE) .......................... 10 2010 052 799

(51) Int. Cl.
*G01B 7/14*    (2006.01)
*H02P 6/18*    (2016.01)
*H02P 6/185*    (2016.01)

(52) U.S. Cl.
CPC ................... *G01B 7/14* (2013.01); *H02P 6/18* (2013.01); *H02P 6/185* (2013.01)

(58) Field of Classification Search
CPC .............. H02P 6/18; H02P 6/185; G01B 7/14
See application file for complete search history.

(56) References Cited

U.S. PATENT DOCUMENTS

| 5,339,012 A | 8/1994 | Schroedl et al. |
| 6,856,114 B2 | 2/2005 | Netz et al. |
| 2009/0278485 A1* | 11/2009 | Strothmann ............ H02P 6/185 318/400.33 |
| 2011/0057593 A1* | 3/2011 | Williams ................ H02P 6/185 318/400.26 |

FOREIGN PATENT DOCUMENTS

| DE | 102006046637 Y | 6/2007 | |
| WO | 9201331 | 1/1992 | |
| WO | WO 2011026578 A2 * | 3/2011 | .......... H02P 21/0039 |

* cited by examiner

*Primary Examiner* — Paul D Lee
*Assistant Examiner* — Mark I Crohn
(74) *Attorney, Agent, or Firm* — Lucas & Mercanti, LLP; Klaus P. Stoffel

(57) ABSTRACT

An apparatus for determining the position of the rotor of an electric machine in relation to the stator. The machine has multiple phases, each of which includes at least one pole winding with a magnetizable core. The apparatus includes devices for detecting measurement signals that are characterized by the momentary degrees of magnetization of the pole winding cores. The degrees of magnetization are influenced by the angular position of the magnetic field of the rotor. The devices are also used to detect the currents in the phases and determine the angular position of the rotor from the detected measurement signals, taking into account a contribution of the phase currents to the degrees of magnetization of the pole winding cores.

10 Claims, 3 Drawing Sheets

APPARATUS FOR DETERMINING THE ANGULAR POSITION OF THE ROTOR OF AN ELECTRIC MACHINE

The present application is a 371 of International application PCT/DE2011/075283, filed Nov. 23, 2011, which claims priority of DE 10 2010 052 799.8, filed Nov. 24, 2010, the priority of these applications is hereby claimed and these applications are incorporated herein by reference.

BACKGROUND OF THE INVENTION

The invention pertains to a apparatus for determining the position of the rotor of an electric machine in relation to the stator, wherein the machine comprises several phase strands, each of which comprises a pole winding with a magnetizable core, with devices for acquiring measurement signals characteristic of the instantaneous degrees of magnetization of the pole winding cores influenced by the rotational position of the magnetic field of the rotor.

An apparatus of this type is described in DE 10 2006 046 637 A1. The magnetic field of the rotor of the electric machine magnetizes the cores of the pole windings to different degrees as a function of the angular position of the rotor, resulting in different degrees of angular position-dependent magnetization and thus to different inductances in the phase strands. Over each half of a magnetic period there are unique relationships between the inductances and the angular position of the rotor. The angular position of the rotor can be determined by acquiring signals representative of these inductances.

SUMMARY OF THE INVENTION

The invention is based on the goal of creating a new apparatus of the type described above which makes it possible to determine the angular position of the rotor with increased accuracy.

The inventive apparatus which achieves this goal is characterized in that the previously mentioned devices are also provided to detect the currents in the phase strands and to determine the angular position of the rotor from the acquired measurement signals under consideration of the contribution which the phase strands make to the degrees of magnetization of the pole winding cores.

According to the invention, the present invention takes into account the influence of the instantaneous phase-strand currents on the degrees of magnetization of the pole windings, so that even when, in addition to the magnetic field of the rotor, the magnetic field generated by the phase-strand currents also plays a significant role in the magnetizations of the cores, it will still be possible to determine the rotational position with precision.

It is preferred that measurement signals representative of the instantaneous inductances of the phase stands be acquired.

Over the course of half a magnetic period, there is a unique, predictable relationship between the acquired measurement signals and the vector of the overall magnetic flux permeating the electric machine, which means that, on the basis of the measurement signals, a conclusion can be reached concerning the magnetic flux vector. Measuring the current as proposed by the invention makes it possible to determine the contribution which the flux generated by the phase strands makes to the overall flux. The vectorial difference between the overall flux and the component generated by the phase-strand currents gives the magnetic flux vector of the rotor. When the magnetic flux vector of the rotor is known, the rotational position of the rotor is also known.

In an especially preferred embodiment of the invention, furthermore, an additional device is provided to energize the phase strands; this is supplemental to the operating current which generates the torque, and it has the effect increasing the degree of magnetization of the cores, which in turn enhances the signals. The invention thus not only takes into account the influence of the operating current on the measurement signals but also provides supplemental current in targeted fashion to increase the accuracy with which the position of the rotor can be determined. This supplemental current increases the degrees of magnetization of the pole winding cores, which leads to stronger measurement signals, which can then be distinguished more clearly from interference signals.

The device for supplying supplemental current is preferably provided to change the vectorial contribution which the magnetic flux generated by the phase-strand currents makes [to the overall flux, the vector of this contribution being parallel to that of the rotor's contribution to the overall magnetic flux. It is advantageous that this does not lead to any change at all in the motor torque. The supplemental current leads only to an increase in the strength of the measurement signals.

The phase strands are preferably wired at least partially in star fashion, and the devices for acquiring the measurement signals are provided to evaluate the potential at the star point.

The devices for acquiring the measurement signals are preferably provided to tap, especially at the star point, the potential changes generated by voltage pulses applied to the phase strands.

The signal acquisition devices preferably acquire measurement signals which are associated with voltage pulses applied in sequence to the phase strands, wherein the pulses are offset from each other in time by a short interval Δt, during which the position of the rotor experiences practically no change.

The measurement pulses which are used can also be the pulses which serve to energize the electric machine according to the pulse width modulation (PWM) method, wherein the direct voltage of a battery is cyclically applied in pulses to the electrical machine.

BRIEF DESCRIPTION OF THE DRAWING

The invention is explained in greater detail below on the basis of exemplary embodiments and the attached drawings, which refer to one of these examples.

DETAILED DESCRIPTION OF THE INVENTION

Figure 1:
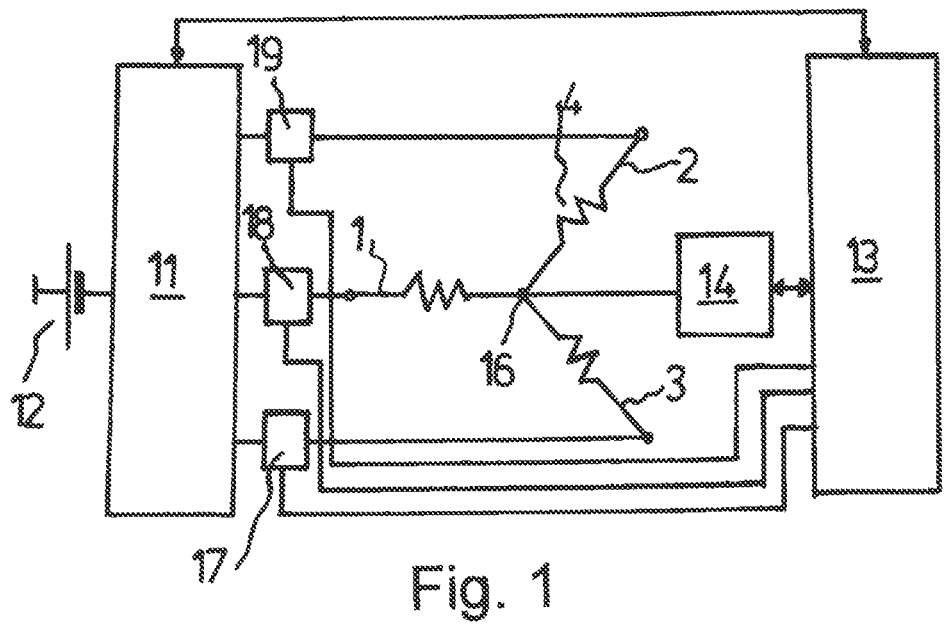
FIG. 1 shows a schematic diagram of an electric machine with an apparatus according to the invention.
Figure 2:
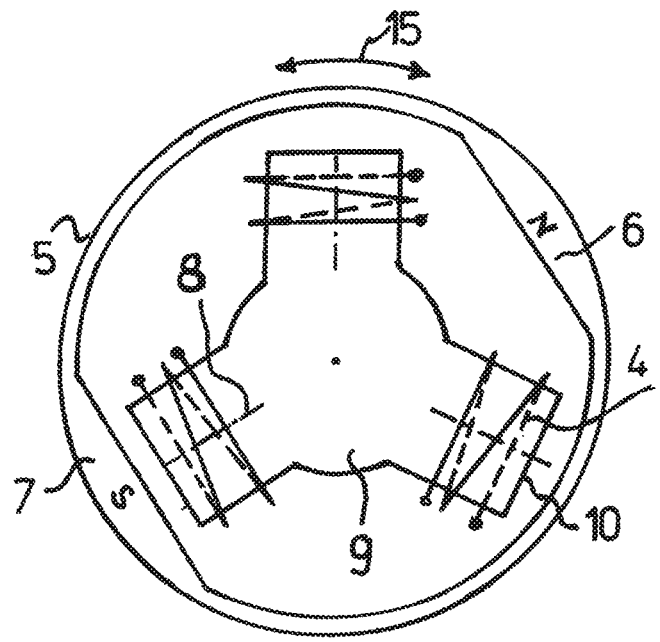
FIG. 2 shows a schematic cross section of the electric machine of FIG. 1.

An electric machine illustrated schematically in FIGS. 1 and 2 comprises three star-wired phase strands 1, 2, 3, each with a pole winding 4, on a stator 9. The electric machine comprises an external rotor 5 with permanent magnets 6, 7, which form a north pole and a south pole. The axes 8 of the pole windings 4 are at an angle of 120° to each other. Each of the pole windings is filled by an iron core 10.

In a departure from the exemplary embodiment shown here, the electric machine could be designed with four poles; could comprise more than one pole winding per phase strand; and, in place of a single magnetic period, could comprise several magnetic periods, each with a north pole and a south pole. The number of phase strands could also be greater than or less than three. In place of the star wiring of the phase strands 1, 2, 3 shown, it would also be possible to wire them in delta fashion.

A power switching device 11 serves to energize the electric machine; this device applies the direct voltage $U_B$ of a battery 12 in pulses to the phase strands 1, 2, 3 in accordance with the pulse width modulation (PWM) method. The power switching device 11 is connected to a control circuit 13, which, among other things, controls the energizing of the electric machine by the power switching device 11.

A signal acquisition device 14 is connected to the star point 16 and to the control circuit 13. The currents $I_1$, $I_2$, $I_3$ in the phase strands 1, 2, 3 can be determined by ammeters 17, 18, 19, which are also connected to the control circuit.

Depending on the angular position of the external rotor 5, which rotates around the stator 9 as indicated by the arrow 15, the magnetic field of the external rotor 5 permeates the iron-filled pole windings 4 of the stator 9 to different degrees. The flux densities $B_{M1}$, $B_{M2}$, and $B_{M3}$ generated in the iron-filled pole windings 4 differ correspondingly. In particular, the degrees of magnetization $dB_M/dB$ of the three iron cores 10 differ from each other as a result of the nonlinear functional relationship between the flux density $B_M$ with iron and the flux density B without iron. The degrees of magnetization caused by the magnetic field of the external rotor 5 depend uniquely on the angular position of the external rotor 5 over the course of half a magnetic period, i.e., over a rotational angle range of 180°.

Figure 3:
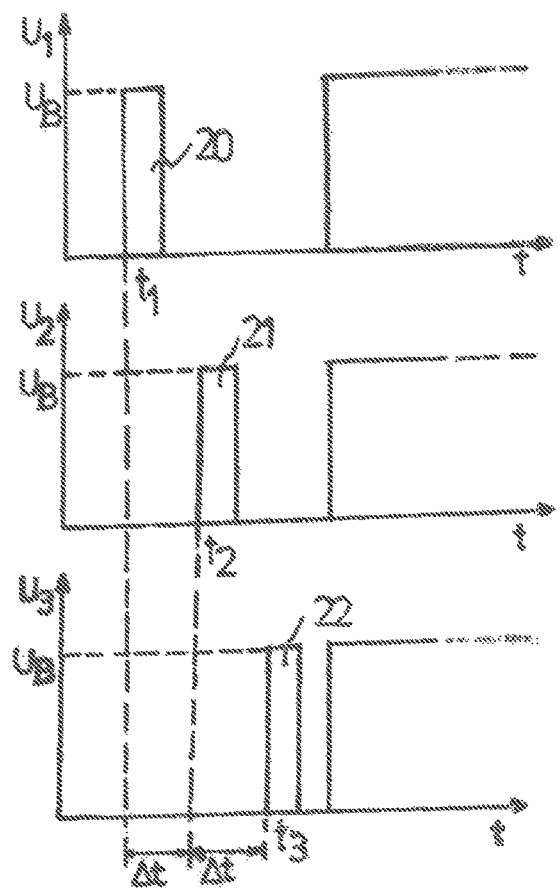
FIG. 3 shows a diagram explaining the application of measurement pulses to the electric machine of FIGS. 1 and 2.
Figure 4:
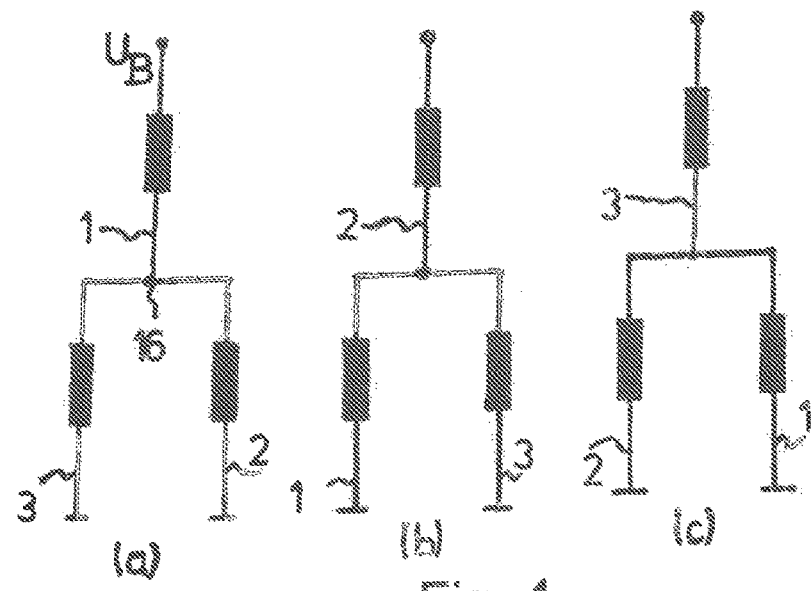
FIG. 4 shows a diagram explaining the tapping of signals at the star point of the electric machine of FIGS. 1 and 2.

In the exemplary embodiment shown here according to FIGS. 3 and 4, as part of the energizing of the electric machine according to the PWM method, measurement pulses 20, 21, 23 of the level of the direct voltage $U_B$ of the battery 12 are applied in sequence, offset from each other in time by the interval $\Delta t$, to the phase strands 1, 2, 3 prior to each PWM cycle. The pulse duration and the time interval $\Delta t$ are so small that the rotational position of the external rotor 5 experiences practically no change during this time. Also remaining unchanged during these short time intervals are the currents $I_1$, $I_2$, and $I_3$ flowing through the phase strands 1, 2, 3 and the voltages induced in the phase strands by rotation of the external rotor 5.

With respect to the drop in the pulse voltage $U_B$ over the phase strands 1, 2, 3, only the instantaneous inductances $L_1$, $L_2$, $L_3$ of the phase strands 1, 2, 3 are important, into which the degrees of magnetization $dB_{m1}/dB$, $dB_{m2}/dB$, and $dB_{m3}/dB$ of the associated iron cores 10 of the pole windings 4 enter as a factor.

According to FIG. 4a, the voltage $U_B$ of the pulse 20 applied at time $t_1$ falls across phase strand 1 and, connected in series to it, a parallel circuit consisting of phase strands 2 and 3. For the voltage divider ratio, we have:

$$U_{S1}/U_B = L_2 \times L_3 / (L_1 \times L_3 + L_1 \times L_2 + L_2 \times L_3) \tag{1}$$

where $U_{S1}$ is the potential at the star point 16.

The voltage pulse applied to phase strand 1 at time $t_1$ therefore triggers a pulse of the level $U_{S1}$ at the star point 16, which can be superimposed on a comparatively slowly changing, induction-generated voltage value.

To the extent that the operating currents $I_1$, $I_2$, $I_3$ flowing through the phase strands 1, 2, 3 are not important with respect to the instantaneous inductances $L_1$, $L_2$, $L_3$, the pulse level $U_{S1}$ over each half magnetic period is a unique function of the rotational angle α of the external rotor 5, wherein the functional change in the signal $U_{S1}$ with the angle α corresponds approximately to a sine function.

The same applies to signals $U_{S2}$ and $U_{S3}$, which are generated by the voltage pulses applied to phase strands 2 and 3 at times $t_2$ and $t_3$. The signals $U_{S1}$, $U_{S2}$, and $U_{S3}$ are shifted with respect to each other by a phase angle of 120°. On the basis of these signals, the angular position of the rotor can be determined as described in DE 10 2006 046 637 A1, which is included here by reference. To generate the signals, it would also be possible to use the energizing pulses used for energizing by the PWM method instead of separate voltage pulses.

It will not be possible to determine the angular position of the external rotor 5 directly from the signals $U_{S1}$, $U_{S2}$, $U_{S3}$ if, as a result of large operating currents $I_1$, $I_2$, $I_3$, relatively weak magnets of the external rotor 5, and/or a large air gap, not only the magnetic field of the external rotor 5 but also the magnetic field of the stator 9 generated by the operating currents $I_1$, $I_2$, $I_3$ are important for the instantaneous inductances $L_1$, $L_2$, $L_3$. In this latter case, i.e., the case in which the operating currents also enter into the signals $U_{S1}$, $U_{S2}$, $U_3$ acquired at the star point 16, these signals are nevertheless in a unique relationship, within half a magnetic period, with the vector of the magnetic flux φ, which permeates the electric machine and which is composed of the vectorial sum of the magnetic fluxes of the three pole windings 120° apart from each other. If we consider the signals $U_{S1}$, $U_{S2}$, $U_{S3}$ as if they formed vectors at an angle of 120° to each other, a certain overall vector of the signals $U_{S1}$, $U_{S2}$, $U_{S3}$, which form the vectorial components at an angle of 120° to each other, corresponds to a certain vector of the magnetic flux φ within one-half of the magnetic period. It is therefore possible by the inverse process to arrive at the vector of the magnetic flux φ from an acquired overall vector of the signals $U_{S1}$, $U_{S2}$, $U_{S3}$.

In addition, the vectorial contribution of the magnetic flux $φ_S$ of the stator 9 to the total magnetic flux φ can be determined on the basis of the currents $I_1$, $I_2$, $I_3$, which can be acquired by means of the ammeters 17-19. The vectorial contribution of the magnetic flux $φ_R$ of the rotor 5 to the total magnetic flux φ is then derived from the vectorial difference between the magnetic flux φ and the stator component $φ_S$:

$$φ_R = φ - φ_S \tag{2}$$

Once the vectorial component $φ_R$ is known, the rotational position of the external rotor 5 is also known.

The signals $U_{Si} - U_B/3$ resulting at the star point 16 are weak when the inductances $L_i$ differ only slightly from one phase strand to the other, which can be the case when the magnets of the external rotor 5 are weak; when the operating currents $I_1$, $I_2$, $I_3$ flowing through the phase strands are low; and/or when the air gap is large.

By means of supplemental energizing of the electric machine, however, the degrees of magnetization $dB_M/dB$ can be increased, which has the effect of making the signals stronger. The signals acquired at the star point are then less sensitive to interference.

Figure 5:
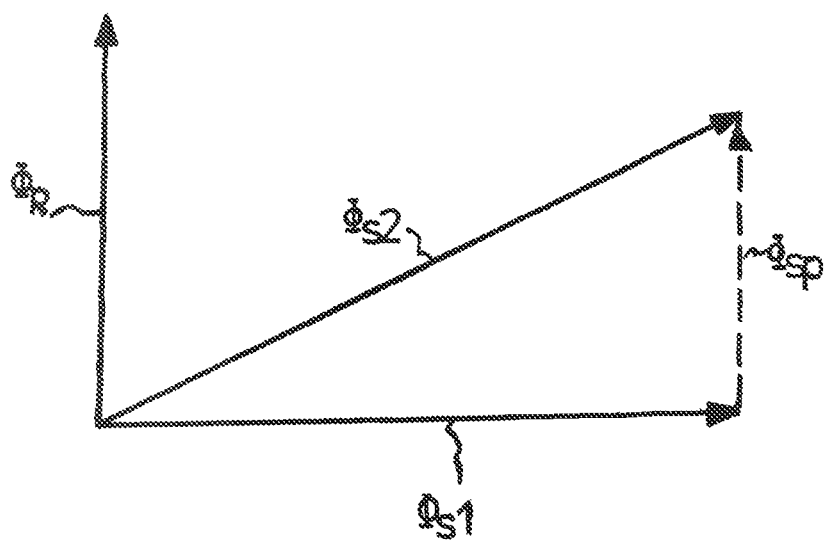
FIG. 5 shows a diagram explaining a supplemental energizing of the electric machine of FIGS. 1 and 2 to enhance the measurement signals.

The supplemental energizing is advisably accomplished in such a way that the energizing does not change the torque of the motor. This can be achieved by energizing in such as way that only a component $\varphi_{sp}$ of the stator flux $\varphi_S$ parallel to the rotor flux $\varphi_R$ is changed, as FIG. 5 explains.

The magnitude of the motor torque is expressed by the cross-product $\varphi_S \times \varphi_R$. If the supplemental energizing of the electric machine leads to a stator flux $\varphi_{S2}$ which is merely the sum of the original stator flux $\varphi_{S1}$ and the component $\varphi_{sp}$ parallel to the rotor flux, then the torque does not change. The supplemental stator flux $\varphi_{sp}$ parallel to the rotor flux $\varphi_R$ does contribute advantageously, however, to the enhancement of the measurement signals.

The invention claimed is:

1. An apparatus for determining a position of a rotor of an electric machine in relation to a stator, during operation of the machine, wherein the machine includes several phase strands, each of which has at least one pole winding with a magnetizable core, the apparatus comprising devices for acquiring measurement signals characteristic of instantaneous degrees of magnetization of the pole winding cores influenced by a magnetic field of the rotor and depending on an angular position of the rotor, wherein the devices for acquiring measurement signals are configured to tap potential changes at a measurement point on the stator caused by applying measurement voltage pulses or PWM operation pulses to the phase strands, wherein each of the potential changes occurs within a time interval Δt in which there is no change of the angular position of the rotor and which is shorter than a PWM period, and wherein the apparatus further comprises devices configured to measure operational currents in the phase strands within the time interval Δt in which the operational currents and voltages induced in the phase strands are unchanged, and to determine the angular position of the rotor from the potential changes and operational currents under elimination of a contribution of the operational currents to the degrees of magnetization of the pole winding cores.

2. The apparatus according to claim 1, wherein the measurement signals are representative of instantaneous inductances of the phase strands.

3. The apparatus according to claim 1, wherein said devices are provided to deduce a vector of magnetic flux ($\varphi$) permeating the electric machine from the acquired measurement signals; to determine a vectorial contribution ($\varphi_S$) of the currents in the phase strands to the magnetic flux ($\varphi$); and to determine a vectorial contribution ($\varphi_R$) of the magnetic field of the rotor to the magnetic flux ($\varphi$) based on a difference between the magnetic flux ($\varphi$) and the vectorial contribution ($\varphi_S$) of the phase strands.

4. The apparatus according to claim 3, further comprising a device for energizing the phase strands supplemental to the operating current generating the torque of the motor to enhance the measurement signals by increasing the degree of magnetization of the pole winding cores.

5. The apparatus according to claim 4, wherein the energizing device is provided to change a component ($\varphi_{sp}$) of the vectorial contribution ($\varphi_S$) of the phase strands, this component being parallel to the vectorial contribution ($\varphi_R$) of the rotor.

6. The apparatus according to claim 1, wherein the phase strands are wired at least partially in star fashion, and the devices for acquiring measurement signals are provided to evaluate the potential at the star point.

7. The apparatus according to claim 6, wherein the devices for acquiring the measurement signals acquire changes in potential associated with voltage pulses applied to the phase strands.

8. The apparatus according to claim 7, wherein the devices for acquiring the measurement signals acquire changes in potential associated with voltage pulses applied in sequence to the phase strands.

9. The apparatus according to claim 8, wherein the sequentially applied pulses are offset in time from each other by a short time interval, during which the position of the rotor does not change.

10. The apparatus according to claim 8, wherein the electric machine is designed to be energized by pulsed application of a direct voltage to the phase strands, and the voltage pulses generating the measurement signals are simultaneously energizing pulses.

* * * * *